United States Patent [19]

Ballu

[11] Patent Number: 5,176,276
[45] Date of Patent: Jan. 5, 1993

[54] DISASSEMBLABLE CONTAINER CAPABLE OF SUSTAINING AN INTERNAL PRESSURE

[75] Inventor: Patrick J. Ballu, Reims, France

[73] Assignee: Tecnoma, Epernay, France

[21] Appl. No.: 726,191

[22] Filed: Jul. 5, 1991

[30] Foreign Application Priority Data

Jul. 6, 1990 [FR] France .................. 90 08676

[51] Int. Cl.⁵ ............................................ B65D 45/00
[52] U.S. Cl. .................................. 220/240; 220/316; 220/324
[58] Field of Search ............... 220/203, 208, 209, 240, 220/316, 324

[56] References Cited

U.S. PATENT DOCUMENTS

| | | | |
|---|---|---|---|
| 3,128,009 | 4/1964 | Norton | 220/316 |
| 3,135,417 | 6/1964 | Gardiner et al. | 220/316 |
| 3,990,605 | 11/1976 | Hanke et al. | |
| 4,444,331 | 4/1984 | Lankston | |
| 4,452,372 | 6/1984 | Robbins | 220/316 |
| 4,620,643 | 11/1986 | Sebillotte | |
| 4,840,287 | 6/1989 | Brewer et al. | 220/316 |
| 4,936,483 | 6/1990 | Ballu | |

FOREIGN PATENT DOCUMENTS

| | | |
|---|---|---|
| 0325518 | 7/1989 | European Pat. Off. |
| 1297424 | 6/1969 | Fed. Rep. of Germany |
| 7824088 | 11/1978 | Fed. Rep. of Germany |
| 1366745 | 6/1964 | France |

Primary Examiner—Joseph Man-Fu Moy
Attorney, Agent, or Firm—Watson, Cole, Grindle & Watson

[57] ABSTRACT

A disassemblable container capable of sustaining pressure and disassemblable into a body and a lid and which is assembled with a leaktight seal includes a piece which is movable but integrally connected to the body and is pushed into a cavity of the lid under the effect of the internal pressure acting on a shutter and in opposition to an elastic return member. By pressing the movable piece, the shutter is brought into a pressure-release position. The shutter prevents the opening of the container when under an excessively high pressure and advantageously also serves as a safety shutter against overpressures.

9 Claims, 2 Drawing Sheets

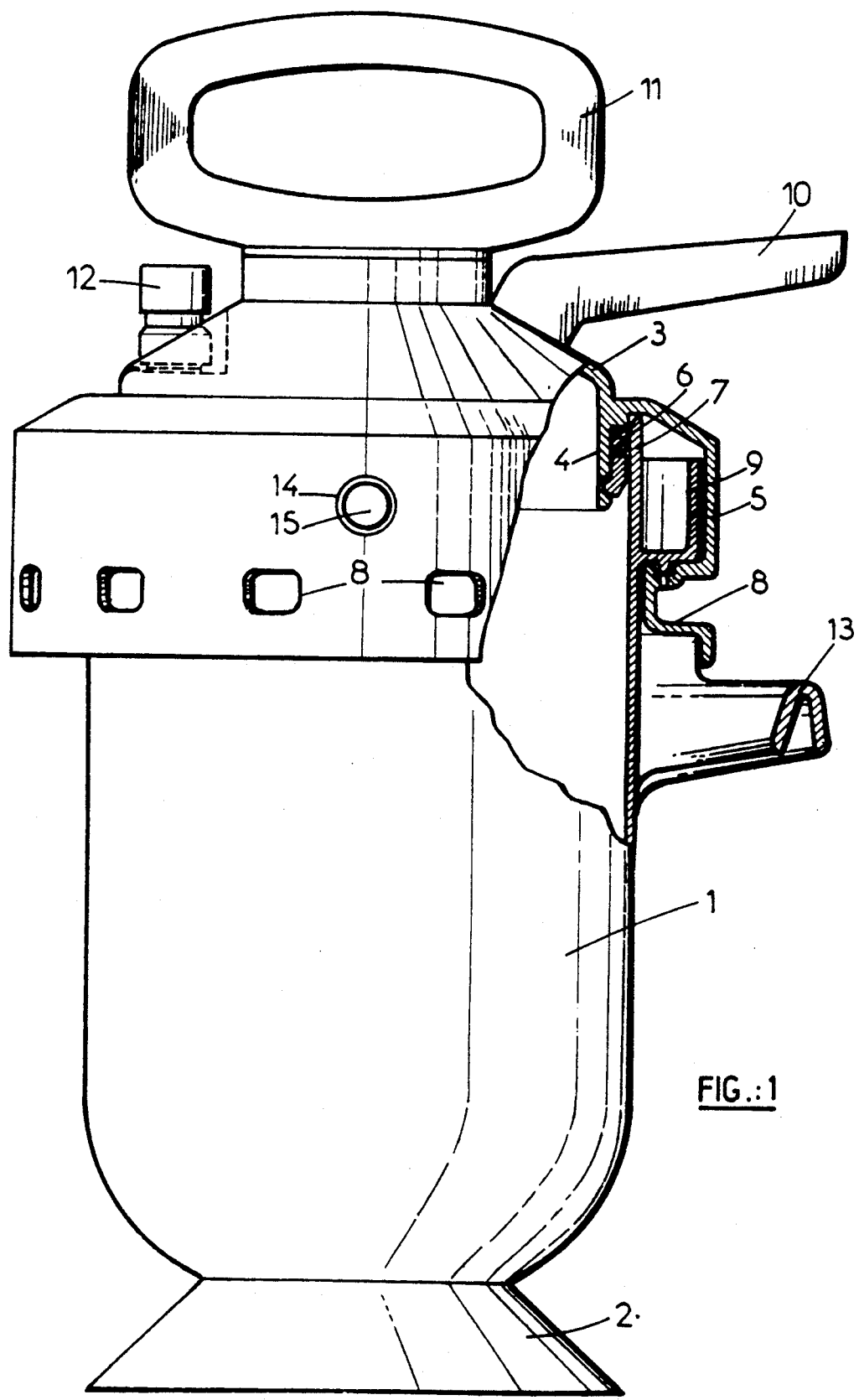
FIG.:1

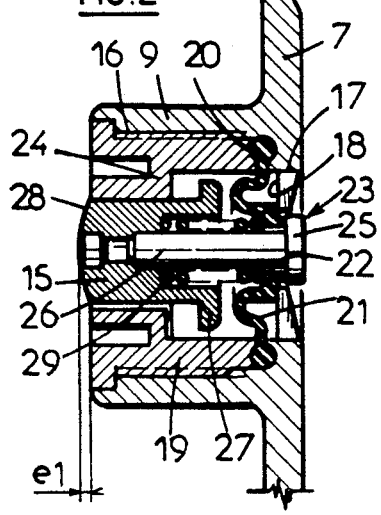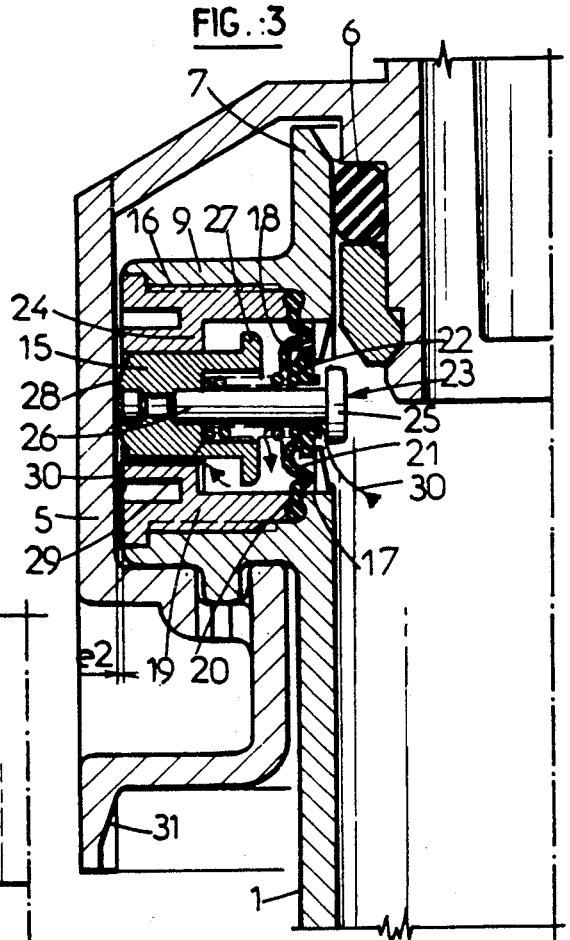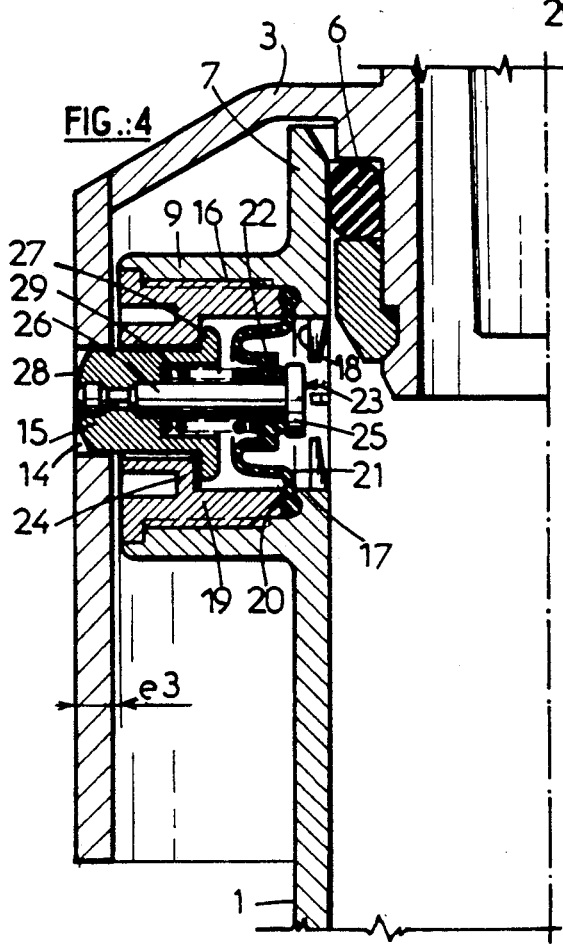

DISASSEMBLABLE CONTAINER CAPABLE OF SUSTAINING AN INTERNAL PRESSURE

BACKGROUND OF THE INVENTION

The present invention relates to a container intended to sustain an internal pressure and which can be disassembled into two elements, a first element having a cylindrical portion which penetrates into a cylindrical portion of a second element, the container also including a seal inserted between these two cylindrical portions.

When the joining line of the two elements of a two-part pressure-resistant container has a considerable length, recourse is often had to a connection via parallel flanges between which is placed a seal. This arrangement is reliable but heavy and unwieldy, and the operations of assembling and disassembling the container are lengthy. This is in particular the case when the container, which is for example cylindrical with two optionally convex ends, includes two elements joined in the portion of maximum diameter, i.e., in order to facilitate inspection and cleaning operations. At least one of the two elements can have closable orifices of a smaller diameter for filling or emptying, and the closing of these orifices generally presents less serious problems.

The disassemblable containers which make use of the penetration of a cylindrical portion (male portion) into another portion (female portion) are less heavy and less unwieldy by virtue of the absence of the flanges. In particular, they have the advantage of permitting rapid assembly and disassembly. However, they have the risk, which is inherent to rapid disassembly, of this disassembly taking place whilst the container is still pressurized, which can cause accidents.

In order to avoid this risk, it has been proposed in European Patent Application No. 0,325,518 to provide for the outer surface of the female element to bear fastening means capable of interacting with fastening means provided on a connecting member integral in axial translational motion with the male element, and for the thickness of the female element to be calculated so that when a specified internal pressure is applied to the container, the latter deforms in order to make it impossible for the fastening means to be actuated with a view to opening the container. This advantageous solution requires that the operating pressure and the deformability properties of the material are known and remain within specified limits.

Also, U.S. Pat. Nos. 3,990,605 and 4,444,331 disclose a locking device connected to a device for connection to the atmosphere. In both cases there is a valve for connection to the atmosphere, the outer part of which forms a cap and can be removed by being unscrewed. When this outer part is screwed in, it prevents the lid from being unscrewed by virtue of a lug or a fork which is connected to the lid, and abuts this outer part. This piece therefore must be unscrewed in order to be able to turn the lid, which results in the container being connected to the atmosphere.

These devices make use of a disassemblable piece which must be removed each time the container is opened. It is possible for this piece to be replaced by a replacement closing means, devised by the user, and which does not fulfill the safety function in an appropriate manner. This can be because the disassemblable piece is damaged or because the user wishes to avoid having to carry out the disassembly each time he opens the container.

Furthermore, U.S. Pat. No. 4,620,643 and German Patent Application 1,297,424 disclose locking devices associated with a means for connection to the atmosphere. A valve for connection to the atmosphere comprises a movable piece connected to a shutter, and a movable locking member comprises a surface which is displaced perpendicularly to the axis of the shutter and comprises a cavity capable of receiving the movable piece. When the movable piece penetrates into the cavity, the shutter closes, permitting the pressurization, and simultaneously the locking member is immobilized by the movable piece in a position locking the lid. When a different portion of the movable surface is opposite the movable piece, the shutter is held open, and at the same time the locking member can be displaced.

The presence of this locking member gives rise to a complication, and hence an increase in costs.

SUMMARY OF THE INVENTION

The object of the present invention is to provide a container provided with a safety device combining the locking of the lid and the connection to the atmosphere, which is simpler to operate and of a less expensive construction that those of the prior art.

Consequently, the invention provides a container comprising a body which comprises a first cylindrical portion, and a lid which comprises a second cylindrical portion of an internal diameter greater than the external diameter of the first cylindrical portion of the body, the lid being fitted by pushing the second cylindrical portion over the first cylindrical portion by screwing or otherwise, the container furthermore comprising a safety device which comprises:

- a movable piece integral with a shutter which is held closed in sealing contact with a sealing means by the action of the pressure inside the container and which can be held open under the effect of a compressive force originating from outside,
- an outer surface which can move perpendicularly to the shutter and is capable of exerting the compressive force on the movable piece in order to hold the shutter open,
- a cavity provided in the outer surface and into which can penetrate the movable piece when it is aligned with the cavity, it then being possible for the shutter to move into the closing position, and
- wherein the outer surface consists of the lid itself or the second cylindrical portion, and the cavity traverses the wall of the lid or of said cylindrical portion.

According to one advantageous embodiment, the sealing means comprises a diaphragm in the form of an annular disk, the outer edge of which is fixed in sealing fashion to the wall of a passage traversing the wall of the container, this passage containing the movable piece and the shutter, the inner edge of the diaphragm constituting a sealing ring which can move with play along the movable piece and is capable of coming into sealing contact, by way of one face, with the shutter or of bearing against at least one abutment, this ring being pushed toward the shutter or toward the abutment by an elastic means which bears on the body of the container.

The effect of this elastic means is to push, via the sealing ring, the movable piece toward the inside of the container when the internal pressure is low, in order to facilitate the fitting or removal of the lid.

The diaphragm is advantageously elastic and independently constitutes the elastic means.

According to one advantageous embodiment, the container comprises an additional elastic means which maintains a sealing contact between the sealing means and the shutter as long as a counterforce resulting from a deliberate action on the movable piece, from an incorrect putting in place of the lid or from an internal overpressure, does not exceed the force of the additional elastic means.

The shutter is thus reliably held closed when the container is open, which facilitates a subsequent rise in pressure.

BRIEF DESCRIPTION OF THE DRAWINGS

The invention will now be described in more detail with the aid of an exemplary embodiment illustrated with the aid of the drawings, in which:

FIG. 1 is an overall view of a container according to the invention.

FIGS. 2, 3 and 4 show, in section, the locking device respectively in the situation of opening the container, of connection to the atmosphere and of maintaining under pressure.

DETAILED DESCRIPTION OF THE PREFERRED EMBODIMENT OF THE INVENTION

The device described in the figures is a portable tank of a spraying apparatus, equipped with a manually actuated pump. It comprises a body 1 having a base 2 and of a generally cylindrical shape with a vertical axis. A lid 3 comprises, in its lower part, an inner skirt 4 and an outer skirt 5. The inner skirt fits inside the body, a seal 6 ensuring leaktightness. The outer skirt surrounds the upper edge 7 of the body, at a given distance from the latter. It bears projections 8 which point radially inwards and engage beneath projections 9 pointing radially outwards and carried by the body. These projections as a whole constitute a quick-locking assembly of the bayonet type.

Furthermore, the lid bears a side handle 10 intended to facilitate the locking of the assembly of projections by rotation of the lid about the vertical axis. At the center of the lid a handle 11 has been shown which controls an internal pump intended to pressurize the inside of the container once it is closed. The reference 12 designates a valve. A side handle 13 has also been shown which is integral with the body and serves to immobilize the latter when operating the quick-locking assembly.

The outer skirt has a circular lateral orifice 14 through which passes, in the closed position, the control button 15 of a shutter device which will now be described in more detail with the aid of FIGS. 2 to 4.

The safety mechanism described in these figures is housed, as a whole, inside one of the projections 9 provided on the outer face of the body, in proximity to its upper edge. More precisely, the safety mechanism is placed in a radial housing which traverses the wall of the projection 9 and comprises a threaded widened part 16, on the same side as the outer wall of the projection 9, and a narrower part 17 situated in line with the assembly of the upper edge 7 of the body. These two parts are connected by a shoulder 18 which is a radial with respect to the housing.

A retaining piece 19 is screwed into the widened part 16 and retains, between its end 20 and the shoulder 18, the outer edge of an elastic diaphragm 21 in the form of an approximately flat ring. The inner edge of the diaphragm 21 has an increased thickness and constitutes a sealing ring 22.

The shutter 23 is a piece with an approximately cylindrical general shape which can be displaced along the axis of the radial housing, being guided on one side by an inner collar 24 of the retaining piece and on the other side by the wall of the narrower part 17 of the housing. This shutter comprises a widened part 25 in the form of a disk which is capable of bearing against the face of the diaphragm 21 facing toward the inside of the body 1. This widened part is extended by a stem 26 which passes, with play, through the central opening of the diaphragm, and carries the control button 15 which projects outwards. A rib 27 at the base of the control button bears against the inner collar 24 of the retaining piece to prevent the shutter from coming out.

The outer face of the control button 15 has a rounded edge 28 for a reason which will be explained later.

A helical spring 29 surrounds the stem 26 and bears, on the one hand, on the control button 15 and, on the other hand, on the sealing ring 22, and tends to apply the latter against the surface of the projection 25 of the shutter, in order to ensure leaktightness.

FIG. 2 shows the situation of the components of the safety mechanism in the situation where the lid 3 is removed. The spring 29, acting between the outer face of the sealing ring 22 and the rib 27, holds the widened part 25 of the shutter against the inner face of the sealing ring. The inherent elasticity of the diaphragm 21 holds it against the shoulder 18. As a result, the shutter 23 occupies a position in which the control button 15 projects outwards from the projection 9 by a small distance e1, which is only slightly greater than the height of the beveled portion 28.

FIG. 3 shows the situation when the lid 3 has been simply placed on top of the body 1 without being locked. The outer skirt 5, guided by the assembly of projections 8, 9, pushes the locking button inwards so that it now only projects by a distance e2 which corresponds to the play between the skirt 5 and the projection 9. Because the locking finger is pushed inwards, the widened part 25 of the shutter is no longer in contact with the sealing ring 22 which is retained by the shoulder 18, with the result that the fluid contained inside the body is free to escape in the direction of the arrows 30.

The rounded edge 28 of the button 15 has made it possible to fit the lid 3 without the button 15 getting in the way. This fitting is further facilitated by the presence of an inclined edge 31 on the outer skirt 5.

In order to move from the situation in FIG. 3 to that in FIG. 4, the lid 3 was turned about the axis until the hole 14 was opposite the control button 15. The latter was then able to move outwards, under the action of the spring 29, and consequently resume the same position as that seen in FIG. 2, in other words leaktightness is ensured in the region of the shutter.

In order to open the container, it is first necessary to press on the end of the control button 15 in order to separate the shutter from the diaphragm. The compressed air contained inside the container can then escape and, when the pressure has fallen to a sufficiently low level, the diaphragm 21, by virtue of its elasticity, bears again against the shoulder 18. It is then possible to turn the lid. This is because the control button now projects only slightly outwards, with the result that the inner edge of the orifice 14 can act on its rounded edge in order to push it back inwards. There is therefore no longer any obstacle preventing the rotation and opening of the bayonet locking system consisting of the projections 8 and 9.

As can be seen, the equipment is extremely simple but nevertheless provides a high degree of safety.

It will be noted that it could be possible for an operator in a hurry to press on the control button with one hand and to try and unlock the lid by turning it with the other hand. Such an operation is only possible if only a moderate force needs to be exerted on the one hand on the control button 15, in other words if the pressure is relatively low, and on the other hand on the handle 10. It is possible to make it difficult by arranging the safety mechanism in a position such that it is difficult to actuate the handle 10 simultaneously. In the case of dangerous products, double safety can be provided in the form of two shutter systems of the same type which are arranged in locations spaced apart from each other on the periphery of the container, in such a way that it is impossible for the operator to press the two control buttons 15 simultaneously whilst at the same time actuating the handles 10 and 13.

Since the sealing is also ensured by the seal 6 between the body and the lid, it has been possible to increase the internal pressure of the container. This had the consequence that the diaphragm 21 was pushed outwards, in opposition to its elasticity. The diaphragm 21 carries with it the shutter 23 so that its control button 15 penetrates into the hole 14 of the skirt 5 and consequently projects outwards by a distance e3, greater than e1. This distance is limited by the fact that the rib 27 bears on the collar 24 of the bearing piece 19. Since the hole 14 has a cylindrical wall, were an attempt to be made to move the lid 3, this cylindrical wall would prevent such a movement by abutting the likewise cylindrical portion of the button 15.

If the internal pressure of the container were to exceed a value fixed in advance, it would further deform the diaphragm 21 and the sealing ring 22 would move away from the widened part 25, with the result that the pressure would fall again to within the envisaged limits.

The device described thus independently constitutes a twofold safety means: on the one hand, it prevents the container from being opened when the internal pressure is too high and, on the other hand, it constitutes a safety valve preventing overpressures.

I claim:

1. Container comprising a body which comprises a first cylindrical portion, and a lid which comprises a second cylindrical portion of an internal diameter greater than the external diameter of the first cylindrical portion of the body, the lid being fitted by pushing the second cylindrical portion over the first cylindrical portion, the container furthermore comprising a safety device which comprises:

a movable piece integral with a shutter which is held closed in sealing contact with a sealing means by the action of the pressure inside the container and which can be held open under the effect of a compressive force originating from outside, an outer surface forming part of the lid itself, said lid including said second cylindrical portion, which can move perpendicularly to the shutter and is capable of exerting said compressive force on the movable piece in order to hold the shutter open, and a cavity provided in said outer surface and traversing the wall of said lid and into which can penetrate the movable piece when it is aligned with said cavity, the shutter moving into the closing position when said movable piece penetrates into the cavity.

2. Container according to claim 1, in which the sealing means comprises a diaphragm in the form of an annular disk, the outer edge of which is fixed in sealing fashion to the wall of a passage traversing the wall of the container, this passage containing the movable piece and the shutter, the inner edge of the diaphragm constituting a sealing ring which can move with play along the movable piece and is capable of coming into sealing contact, by way of one face, with a surface of the shutter, this sealing ring being pushed toward the shutter or toward the abutment by an elastic means which bears on the body of the container.

3. Container according to claim 2, in which the diaphragm is elastic and independently constitutes said elastic means.

4. Container according to claim 2, furthermore comprising an additional elastic means which maintains a sealing contact between the sealing means and the shutter as long as a counterforce does not exceed the force of said additional elastic means.

5. Container according to claim 3, furthermore comprising an additional elastic means which maintains a sealing contact between the sealing means and the shutter as long as a counterforce does not exceed the force of said additional elastic means.

6. Container according to claim 1, in which the sealing means comprises a diaphragm in the form of an annular disk, the outer edge of which is fixed in sealing fashion to the wall of a passage traversing the wall of the container, this passage containing the movable piece and the shutter, the inner edge of the diaphragm constituting a sealing ring which can move with play along the movable piece, this sealing ring being pushed toward the shutter or toward the abutment by an elastic means which bears on the body of the container.

7. Container according to claim 6, in which the diaphragm is elastic and independently constitutes said elastic means.

8. Container according to claim 6, furthermore comprising an additional elastic means which maintains a sealing contact between the sealing means and the shutter as long as a counterforce does not exceed the force of said additional elastic means.

9. Container according to claim 7, furthermore comprising an additional elastic means which maintains a sealing contact between the sealing means and the shutter as long as a counterforce does not exceed the force of said additional elastic means.

* * * * *